Figure 1:
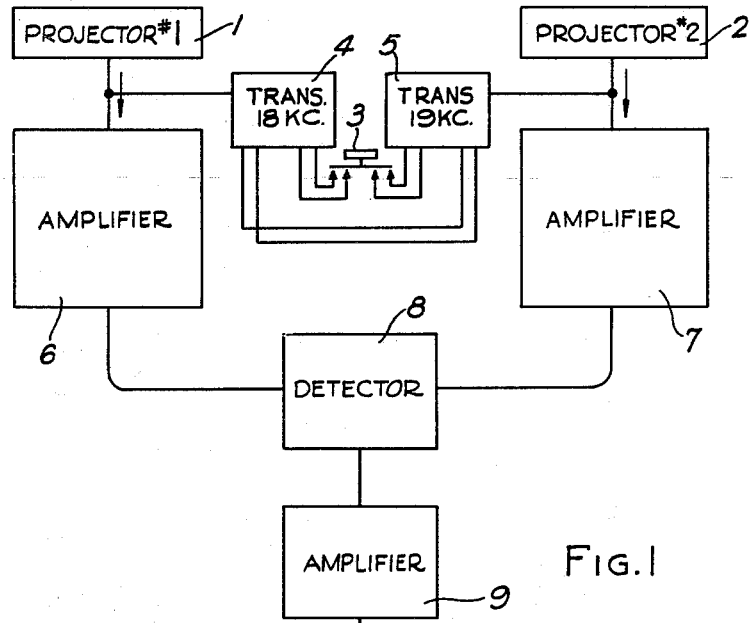

Oct. 14, 1947.  E. E. TURNER, JR  2,428,821
METHOD AND APPARATUS FOR SOUND RANGING
Filed July 19, 1943   2 Sheets—Sheet 1

INVENTOR.
EDWIN E. TURNER, JR.
BY
Ezekiel Wolf
ATTORNEY

Patented Oct. 14, 1947

2,428,821

UNITED STATES PATENT OFFICE 2,428,821

METHOD AND APPARATUS FOR SOUND RANGING

Edwin E. Turner, Jr., West Roxbury, Mass., assignor, by mesne assignments, to Submarine Signal Company, Boston, Mass., a corporation of Delaware Application July 19, 1943, Serial No. 495,371

2 Claims. (Cl. 177—386)

1

The present invention relates to a signaling system useful in signaling in a subaqueous medium and more particularly to a sound ranging and listening system for detecting the presence of foreign obstacles and bodies with the aid of sound reflections.

The invention may also be applied to listening directively as, for instance, to water noise of a vessel or a ship's propeller. The invention is particularly adaptable for use in a sound ranging system in which a sound signal of ultra-high frequency is transmitted in a beam and its echo received after reflection from the object whose direction and distance are to be determined. In such a system various extraneous noises and sounds are present, the most disturbing of which are those which are generally termed "reverberations." The exact origin of such sounds is not always definitely determinable. They may come from irregular surfaces, differences in temperature gradients, the ocean bottom and even from various parts of the vessel from which they are being transmitted and other discontinuities in the water surrounding the vessel.

In sound ranging at ultra-high frequencies of the order of 20 kilocycles, sound pulses or trains are frequently used which are generally transmitted from so-called sound projectors in a concentrated beam of energy. Even with this type of signal, reverberations persist after the transmitter has ceased sending the signal and for this reason sound ranging at the comparatively shorter distances is sometimes more difficult to detect and observe than at more extreme ranges.

Various methods and means have been used with varying degree of success to overcome the difficulties present in ultra-high frequency sound ranging in which the projector transmits the beam and the receiver is directive with the same sound pattern as the transmitter. Such beam patterns usually have a main lobe, which is ordinarily considered as the beam itself, and several auxiliary lobes directed at different angles with maximum intensities lower than that of the main beam and with the auxiliary beam angles somewhat narrower than the main lobe. At higher frequencies the lobe angles become sharper and so also the lobe angles are sharpened as the radiating surface of the transmitter in comparison to the wave length transmitted is increased.

In general, also, if the radiating surface of the transmitter and receiver has a larger amplitude at its center than at the edges, the main lobe angle will be broadened while the auxiliary lobe intensity will be decreased.

2

It is quite common in the known systems to use the projector both for a transmitter and a receiver.

A method which has been quite successfully used in overcoming the difficulties presented by reverberations is that of modulating the transmitted signal with a sweep frequency.

In the present application an effort has been made to overcome the harmful reverberations encountered in sound ranging by paying special attention to the beam characteristics for transmission and reception and to establish these characteristics in such a way that the main lobe of the beam will be received with increased intensity and the auxiliary lobes greatly suppressed. The present invention provides in general an increased signal to noise ratio, besides emphasizing the energy directed to and coming from the object from which reflections and echoes are being obtained. The present methods thereby increase not only the effective range of the sound ranging system but also its reliability in providing clearer and distinct echoes against the noise background caused by reverberations and other extraneous noises present.

The advantages of the present invention may best be accomplished with the use of two projectors which may serve both for transmitting and receiving ultra-high frequency sound waves, although the system may be worked out with the use of one projector as well. With the use of two projectors different frequencies may be employed by each projector and the notes heterodyned together. By impressing the two frequencies together on a detector, the impressed voltage envelope is proportional to the square root of the products of the amplitudes of the original frequencies, and using a detector whose output is a square law function of the input, the output becomes proportional to the products of the amplitudes of the original signal frequencies.

In the arrangement according to the present invention it is preferable to transmit on a projector providing a given characteristic and receive on the same or different projector according to a different characteristic. The maximum effect and greatest efficiency in ranging are accomplished with the use of projectors operating on different frequencies differing by a small amount in conjunction with proper amplifying and detection apparatus by which the greatest effect may be obtained.

Figure 2:
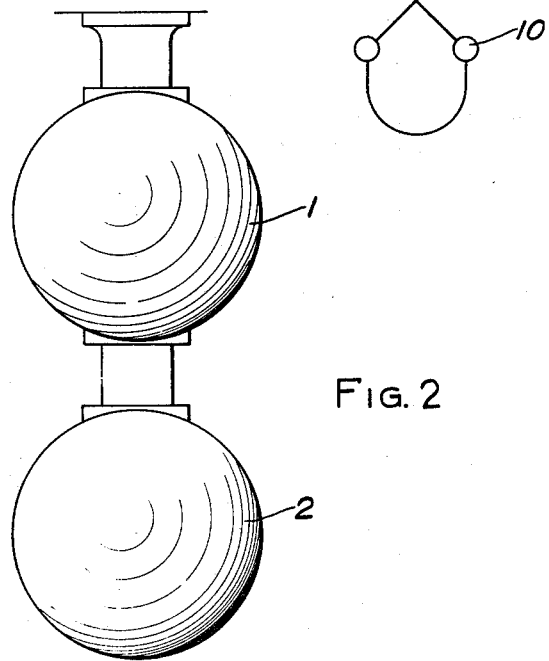

The invention will be more clearly understood by a consideration of the specification below when taken in connection with the drawings in which Fig. 1 shows a block diagram of the system; Fig. 2 shows a face view of a pair of projectors as set forth in Fig. 1; and Figs. 3, 4 and 5 show characteristic curves for the projectors operated in accordance with the present invention.

In the block diagram as shown in Fig. 1, two projectors 1 and 2 may be employed. These projectors are preferably of a supersonic type and may operate by magnetostrictive means or piezoelectric means or any other suitable transmitting and receiving device. An apparatus constructed in accordance with the applicant's prior invention as disclosed in application Serial No. 677,179, filed June 23, 1933, or as disclosed in applicant's application Serial No. 24,078, filed May 29, 1935, or as disclosed in the application of Beverly R. Hubbard Serial No. 669,477, filed May 5, 1933, may be used as a projector or as a transducer for both transmission and reception. If a device is employed as disclosed in my prior application Serial No. 677,179, a uniform energy amplitude distribution may be obtained over the entire diaphragm surface by employing a diaphragm and driving it at a great number of points. For receiving, such a system with an ordinary diphragm or even with a comparatively heavy diaphragm may provide sinusoidal distribution. To obtain desired diaphragm distribution the device may be constructed as disclosed in my application Serial No. 285,910, filed July 22, 1939, Patent Number 2,407,329, or as disclosed in my more recently filed application Serial No. 466,073, filed November 18, 1942. These devices may be so constructed so that each projector may have uniform distribution on transmission and a sinusoidal distribution on reception.

It is further preferable in accordance with the present invention to have each of the projectors transmit on slightly different frequencies. Projector 1 may transmit on a frequency of 18 kilocycles and projector 2 may transmit on, for instance, a frequence of 17 or 19 kilocycles. These signals may be transmitted simultaneously by a common keying device 3 controlling the power of both oscillators or transmitters 4 and 5, respectively. The signal, therefore, may be sent out on projector 1 at a frequency of 18 kilocycles in a beam pattern and on projector 2 at a frequency of 17 or 19 kilocycles with a similar beam pattern. Upon reception of the signal after reflection from the distant object, the receiver diaphragm in normal excitation from the water may produce a sinusoidal or other intensity pattern, which signal is impressed through the projectors acting as receivers, each upon its individual amplifiers 6 and 7, the outputs of which are connected to a common detector 8 operating on the square law so that the detected signal will be directly in proportion to the product of the received signal. The amplifiers 6 and 7 would be tuned only to amplify the signal of one projector so that if one projector alone was being energized, no signal would be transmitted through the detector which produces a signal proportional to the product of the impressed signals. The output of the detector having a square law function would by heterodyning or beating together the two different high frequencies be proportional to the product of the two signals impressed by the amplifiers 6 and 7 on the detector circuit. The detected signal which would then be 1000 cycles may be amplified by a tuned amplifier of 1000 cycles indicated by 9 in Fig. 1 and may thereupon be impressed upon some listening device as, for instance, telephones 10 or some detecting device or indicator as, for instance, a recording device or a cathode ray tube oscilloscope. The amplifiers 6 and 7 are also preferably tuned each to the particular frequency corresponding to that transmitted by the projector.

Figure 3:
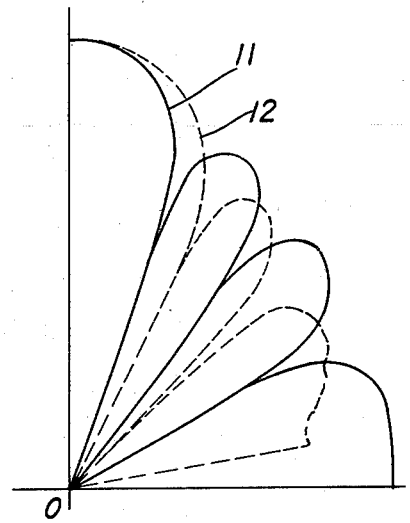
Figure 4:
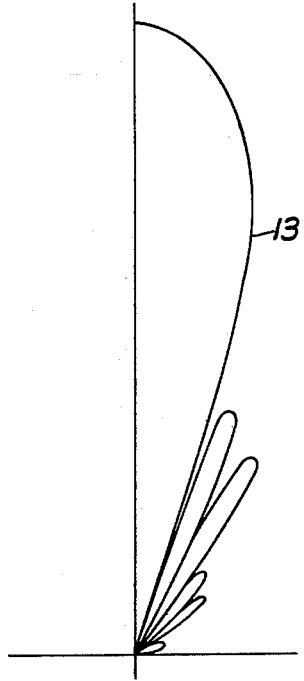
Figure 5:
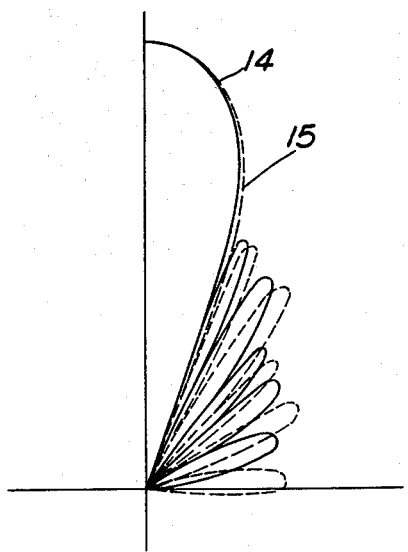

In Figs. 3, 4 and 5 there is shown a group of beam patterns for the system just described. In Fig. 3 the full-line curve 11 shows a projector, either 1 or 2 in Fig. 1, when transmitting with a distribution substantially that of a piston with uniform amplitude over its whole surface. This curve of Fig. 3 is plotted in polar coordinates about a center 0 in decibel units and indicates a main maximum with several secondary maxima. The dotted-line curve 12 of Fig. 3 is plotted in the same manner as the curve 11 where the projector is used for reception with a diaphragm distribution pattern that is substantially sinusoidal extending over one-half a cycle, that is, the distribution is such that it is substantially zero at the edges of the diaphragm and a maximum at the center. For the projector transmitting and receiving with patterns as described, the space pattern is indicated in Fig. 4. This curve is the product of the two curves 11 and 12 of Fig. 3. It will be noted that curve 13 of Fig. 4 has sharpened considerably the main beam and narrowed and reduced considerably the auxiliary maxima. Curve 13 of Fig. 4 represents the over-all pattern for one unit. Two sets of these curves are produced in Fig. 5, the one numbered 14 in full line corresponding to one frequency and the other numbered 15 in dotted line corresponding to the other frequency. The broader maximum in this case 15 corresponds to the lower frequency, for instance, 18 kilocycles, while the narrower band 14 corresponds to the high frequency, 19 kilocycles. These two curves which represent the vector intensities impressed upon the detector 8 are combined in the detector to produce a vector which is the product of the original signals picked up in each projector, so that if one vector, for instance, had a value of three for any point and the other vector four at this same point, the detector would produce a signal proportional to twelve. This is accomplished by using a square law detector working in the range of the beat note established by the combination of the signal from each oscillator. In the present case this beat note would be 1000 cycles, the difference between 19 kilocycles and 18 kilocycles. If one of the signals was missing as, for instance, the 19 kilocycle signal, then no signal would be impressed or passed through the detector.

The curves 14 and 15 of Fig. 5, therefore, combine to further increase the main maximum over the auxiliary maximum, the maximum amplitudes being approximately increased in relation to the fourth power of the original vector amplitudes obtained in a signal beam pattern.

The use of two projectors sending out signals on frequencies sufficiently near one another to provide a local beat for reception and indicating only by means of the beat note so established, eliminates to a large extent reverberations caused by the transmitted signal. Reflections of both frequencies must be present in the detector in order to produce a signal indication and since the extraneous reflections not produced by the target to a good extent lack one or the other of the original transmitted frequencies, the reverberations will thereby be greatly minimized.

Having now fully described my invention, I claim:

1. A ranging system comprising means for transmitting and receiving a beam of ultra-high frequency sound waves, said means providing a substantially uniform radiating surface for transmission and a surface having a sinusoidal distribution for reception, and said means including means for transmitting two frequencies having values sufficiently near together to produce by a combination of the two frequencies a beat signal, detection means operatively connected to said transmitting and receiving means, said detection means operating on a square law characteristic and adapted to receive the beat signal and indicating means for indicating the same.

2. A method for sound ranging which comprises transmitting a signal in the form of an ultra-high frequency sound beam having two frequencies so nearly the same value that when combined they will produce a beat signal, transmitting the signal with one beam pattern and receiving reflected signals of the two frequencies separately and according to a second beam pattern in which the auxiliary maxima for reception occur at different points from those for transmission, and combining said received reflected signals in an indication proportional to the product of the received reflected signals whereby the interference of auxiliary maxima is diminished and the directiveness of the ranging enhanced.

EDWIN E. TURNER, Jr.

REFERENCES CITED

The following references are of record in the file of this patent:

UNITED STATES PATENTS

| Number | Name | Date |
| --- | --- | --- |
| 2,018,463 | Muchow | Oct. 22, 1935 |
| 2,259,982 | Alexanderson | Oct. 21, 1941 |
| 2,116,523 | Kunze | May 10, 1938 |
| 2,407,662 | Hart | Sept. 17, 1946 |

OTHER REFERENCES

Ser. No. 382,084, Menges (A. P. C.), pub. May 18, 1943.